(12) United States Patent
Zhang et al.

(10) Patent No.: US 11,865,852 B2
(45) Date of Patent: Jan. 9, 2024

(54) ROBOTIC LIVERY PRINTING SYSTEM

(71) Applicant: MACDONALD, DETTWILER AND ASSOCIATES INC., Brampton (CA)

(72) Inventors: Mingfeng Zhang, Scarborough (CA); Michel Bondy, Caledon (CA); Piotr Jasiobedzki, Mississauga (CA); Darrell Gaudette, Toronto (CA); Ho-Kong Ng, Thornhill (CA); Timothy John Reedman, Glen Williams (CA)

(73) Assignee: MACDONALD, DETTWILER AND ASSOCIATES INC., Brampton (CA)

(*) Notice: Subject to any disclaimer, the term of this patent is extended or adjusted under 35 U.S.C. 154(b) by 0 days.

(21) Appl. No.: 17/550,296

(22) Filed: Dec. 14, 2021

(65) Prior Publication Data
US 2022/0097411 A1    Mar. 31, 2022

Related U.S. Application Data

(62) Division of application No. 16/643,289, filed as application No. PCT/CA2018/051024 on Aug. 24, 2018, now Pat. No. 11,571,911.

(60) Provisional application No. 62/552,980, filed on Aug. 31, 2017.

(51) Int. Cl.
*B41J 3/407* (2006.01)
*B25J 13/08* (2006.01)

(52) U.S. Cl.
CPC .......... *B41J 3/4073* (2013.01); *B25J 13/086* (2013.01); *B25J 13/088* (2013.01)

(58) Field of Classification Search
CPC ........ B41J 3/4073; B41J 29/38; B25J 13/086; B25J 13/088; B25J 11/00; G05B 2219/45186

See application file for complete search history.

(56) References Cited

U.S. PATENT DOCUMENTS

| | | |
|---|---|---|
| 7,350,890 B2 | 4/2008 | Baird et al. |
| 8,545,943 B2 | 10/2013 | Frankenberger et al. |
| 9,266,353 B2 | 2/2016 | Beier et al. |
| 9,329,587 B2 * | 5/2016 | Fudaba ................ B25J 9/1689 |
| 9,446,585 B2 | 9/2016 | Goyal et al. |
| 9,527,275 B1 * | 12/2016 | Flannigan ............. B41J 25/308 |
| 9,781,350 B2 | 10/2017 | Gao et al. |

(Continued)

FOREIGN PATENT DOCUMENTS

WO    2009088864 A1    7/2009

OTHER PUBLICATIONS

International Search Report dated Dec. 21, 2018, for International Application No. PCT/CA2018/051024 filed Aug. 24, 2018.

*Primary Examiner* — Justin Seo
*Assistant Examiner* — Tracey M McMillion
(74) *Attorney, Agent, or Firm* — HILL & SCHUMACHER

(57) ABSTRACT

The present disclosure provides a robotic printing system for printing images on the surface of an object. One exemplary system includes a printing module carried by a motion platform to directly eject printing materials on a surface. One aspect of this disclosure provides methods for accurately controlling the motion of the motion platform, generating accurate triggering signals for printing heads, and properly aligning adjacent swaths of an image.

33 Claims, 11 Drawing Sheets

(56) References Cited

U.S. PATENT DOCUMENTS

| | | |
|---|---|---|
| 2012/0219699 A1* | 8/2012 | Pettersson ............ B05B 12/124 427/8 |
| 2013/0257984 A1 | 10/2013 | Beier et al. |
| 2014/0242285 A1 | 8/2014 | Pettersson et al. |
| 2015/0197082 A1 | 7/2015 | Rossell et al. |
| 2018/0150058 A1* | 5/2018 | Shapiro ................. G06V 10/40 |

\* cited by examiner

ROBOTIC LIVERY PRINTING SYSTEM

CROSS-REFERENCE TO RELATED APPLICATION

This application is a divisional of U.S. patent application Ser. No. 16/643,289 filed on 28 Feb. 2020, which is a National Stage Entry of International Application No. PCT/CA2018/051024 filed on Aug. 24, 2018, and published on Mar. 7, 2019 as WO 2019/041027, in English, which claims priority to U.S. Provisional Patent Application No. 62/552,980 filed on Aug. 31, 2017, all of which are incorporated herein by reference in their entirety.

FIELD

The present invention is a robotic printing system and method for directly applying livery designs on the surfaces of objects, especially on the various surfaces of aircraft bodies.

BACKGROUND

Painting aesthetic logos and liveries on the surface of large objects such as passenger aircraft is currently a labour-intensive and time-consuming process. A popular approach for livery painting involves multiple iterations of masking, spraying, and curing of a target surface, which require skillful personnel and could take several days to complete painting an aircraft.

Robotic printing systems have been proposed for applying images directly on aircraft and other objects in order to improve the efficiency of livery painting. U.S. Pat. No. 7,350,890 issued to Baird et al. discloses a robotic printing system that can directly apply printing materials on a surface to create livery images. The system disclosed is comprised of an applicator for ejecting ink on a surface, a motivating device for carrying the applicator relative to the surface, and a controller for controlling the motion of the motivating device. The motivating device in this disclosure is a two-frame guiding system that provides motion of three or more degrees of freedom (DOF). This system is mostly suited for printing on near-flat surfaces such as aircraft vertical stabilizers due to the limited flexibility of the guiding mechanism. U.S. Pat. No. 8,545,943 discloses a painting system for painting curved surfaces. The system disclosed consists of a paint material ejection device, a guiding device, and a control device, and the guide device is a semi-circular rail that can mechanically guide the ejection device along a curved surface. While this system is capable of printing on curved surfaces, it remains unclear how this guiding rail can be adjusted for different degrees of curvature. U.S. Pat. Publication No. 9,266,353 discloses a robotic printing system that uses an articulated robot to carry an inkjet printer for livery printing. Because an articulated robot is capable of reaching the surface of objects of irregular shapes, this system provides increased flexibility for printing surfaces of various degrees of curvature.

The main advantage of these robotic printing systems is the potential for more efficient livery printing compared to conventional approaches. By using a motion platform to move a printing device relative to a surface, a robotic printing system can directly apply printing materials on a surface to create an image. This eliminates the repetitive masking and spraying procedure and hence drastically improves the efficiency of livery printing. However, the aforementioned disclosures did not fully address a serious issue: the printing quality of such systems. An image printed by an inkjet printer is formed by a grid of ink droplets of different colours on a printing medium. In order to ensure the image's quality, particularly its resolution, and to avoid other defects such as distortion and banding, ink droplets of the desired colour must be ejected at the desired location on the printing medium. This depends on two conditions. First, the relative motion between the printing medium and the inkjet head must be accurately controlled. Second, the nozzles in the inkjet head must be accurately triggered to eject print material droplets according to their motion relative to the printing medium.

Both conditions require accurate measurements of the relative motion between the inkjet head and the printing medium; however, in the aforementioned disclosures, the motion platform moves the printing device by following pre-defined paths that were created by using a 3D model of a target object. Without online feedback of its motion relative to the object's surface, the printing device's motion is susceptible to a variety of detrimental factors, such as mismatches between the 3D model and the real object, registration errors between the motion platform and the surface, and motion platform tracking errors between the planned and actual paths. The inadequate motion accuracy of these systems implies that they cannot precisely eject ink droplets at high spatial density, thus limiting the achievable resolution. The lack of accurate measurements of the relative motion also limits the accuracy and reliability of the triggering signals for inkjet heads. Due to these limitations, it may be a challenge for these systems to achieve consistently high-quality printing results.

Furthermore, the aforementioned disclosures did not address the challenge of printing a single image seamlessly on a very large object. Since the work envelope of commercially available robotic systems cannot cover the entire surface of a very large object such as a passenger aircraft, a robotic printing system may need to move its base to multiple locations to expand its overall coverage. Therefore, the 3D representation of the image on the surface is divided into multiple swaths to facilitate more accurate printing whereby the robotic printing system prints one or more swaths from one location and then moves to another location corresponding to a location of a next swath(s) to be printed.

In order to ensure that the final printing result is a seamless and continuous image, adjacent swaths must be properly aligned in order to avoid gaps and overlaps. Aligning two adjacent swaths means that the current swath must be printed with respect to the previously printed swath. This requires detecting the location of a previously printed swath when printing the current swath. In addition, the motion of the printing device and the timing of ejection of the print material may need to be dynamically adjusted when printing the current swath. This swath alignment problem adds another level of complexity to the control of the motion platform and the printing device, which was not considered in the aforementioned disclosures.

U.S. Pat. Publication Number 9,527,275 (Flannigan et al.) discloses an inkjet printing system to address this swath alignment problem. The system disclosed simultaneously prints a coded pattern next to a swath that is currently being printed. The coded pattern then serves as a visual guiding cue for the printing system to print the next swath. While this scheme can reliably guide the printing device with respect to a previously printed swath, it requires a separate printing device in addition to the primary printing device. Furthermore, small alignment errors between two adjacent swaths may accumulate over the course of multiple swaths and may eventually lead to a noticeable distortion in the final image.

SUMMARY

The present disclosure provides a robotic printing system for printing images on the surface of an object. One exemplary system includes a printing module carried by a motion platform to directly eject printing materials on a surface. One aspect of this disclosure provides methods for accurately controlling the motion of the motion platform, generating accurate triggering signals for printing heads, and properly aligning adjacent swaths of an image.

The present disclosure provides a method for printing a livery image on a surface of an object and for use in association with a motion platform, the method comprising the steps of:
  i) acquiring data from a local sensing suite;
  ii) acquiring data from one or more global motion tracking devices;
  iii) creating a first measurement product by fusing said acquired data from said local sensing suite and said one or more global motion tracking devices to control the motion platform to move a printing module across said surface; and
  iv) creating a second measurement product by fusing said acquired data from said local sensing suite and said one or more global motion tracking devices to control the timing of ejection of the print material from said printing module.

The local sensing suite may comprise any one or combination of:
  i) one or more range sensors for acquiring range data of the surface; and
  ii) one or more relative motion sensors for measuring relative motion of the printing module with respect to the surface.

The local sensing suite may comprise:
  i) one or more optical sensors for acquiring one of more images of the surface.

The one or more relative motion sensors for measuring relative motion of the printing module with respect to the surface may comprise any of one or more wheel encoders travelling on the surface, one or more non-contact optical sensors estimating relative position or velocity, one or more non-contact capacitive sensors estimating relative motion, or a combination of thereof.

Creating a first measurement product by fusing said acquired data from said local sensing suite and said one or more global motion tracking devices may comprise the steps of:
  i) acquiring range data from one or more range sensors in the local sensing suite for measuring the distance of the printing module relative to a surface;
  ii) acquiring position and orientation measurements of the printing module and the surface from the one or more global motion tracking devices;
  iii) constructing a 3D representation of the surface by said data from the range sensors;
  iv) computing a position and orientation of the printing module in the 3D representation of the surface;
  v) deriving a probabilistic quantification of said computed position and orientation of the printing module from one or more measuring characteristics of the one or more range sensors;
  vi) deriving a probabilistic quantification of said measured position and orientation measurements of the printing module and the surface from one or more measuring characteristics of the global motion tracking devices, and calculating the position and orientation of the printing module relative to the surface from the position and orientation measurements of the printing module and the surface from the global motion tracking devices; and
  vii) merging the probabilistic quantification of the position and orientation of the printing module relative to the surface from the one or more range sensors and the probabilistic quantification of the position of the printing module relative to the surface from the global motion tracking devices.

creating a second measurement product by fusing data from said local sensing suite and said one or more global motion tracking devices to control the timing of applying printing material from said printing module may comprise the steps of:
  i) receiving one or more travel distance measurements from the one or more relative motion sensors in the local sensing suite;
  ii) fusing said travel distance measurements with the pose measurements of the printing module from the one or more of global motion tracking devices;
  iii) generating a triggering pulse when said fused travel distance measurement is equal to or greater than a predetermined travel distance; and
  iv) sending the triggering pulse to the printing module wherein the triggering signal controls the printing heads to apply the printing material.

Controlling a motion platform to move a printing module across a surface may comprise the steps of:
  i) commanding the motion platform to move the printing module along a pre-planned path relative to the surface;
  ii) computing an error between said first measurement product and a desired position, orientation, and velocity of said printing module relative to said surface; and
  iii) applying a plurality of motion correcting commands to the motion platform to correct said errors in the position, orientation, and velocity of the printing module relative to said surface.

The pre-planned path relative to the surface may be determined by the steps of:
  i) dividing said livery image into a plurality of swaths; and
  ii) generating a plurality of paths corresponding to the plurality of swaths for the printing module to follow.

Dividing a livery image into a plurality of swaths may comprise:
  i) loading a 3D representation of the surface from a computer file containing computer readable information of the surface;
  ii) overlaying a representation of the livery image to be printed onto the 3D representation of the surface; and
  iii) dividing the 3D representation of the livery image into a plurality of swaths.

Dividing a livery image into a plurality of swaths may further comprise
  i) acquiring data from a local sensing suite and one or more global motion tracking devices;
  ii) generating a 3D representation of the surface from said acquired data;
  iii) overlaying a representation of the livery image to be printed onto the 3D representation of the surface; and
  iv) dividing the 3D representation of the livery image into a plurality of swaths.

Printing a livery image may further comprise:
i) controlling the mobile platform to move the printing module to follow a first path corresponding to a first swath of the plurality of swaths wherein a print material from the printing module is applied to form a first printed swath corresponding to the plurality of swaths;
ii) determining a location for a next swath to be printed and aligning the next swath to be printed with the first printed swath;
iii) controlling the printing module to follow a path corresponding to the next swath to be printed wherein the print material from the printing module is applied to form a next printed swath; and
iv) repeating steps ii) to iii) until the plurality of swaths have been printed to form a plurality of printed swaths.

Applying the printing material from the printing module to form the next printed swath may comprise applying the printing material to a plurality of regions in close proximity to the one or more boundaries of the first swath at a reduced intensity whereby the path of the next swath to be printed is shifted to allow for overlap between the first printed swath and the next printed swath.

Determining the location for the next swath to be printed and aligning the next swath to be printed to a first printed swath may comprise the steps of:
i) determining a plurality of boundaries of said first printed swath;
ii) computing a path shift for printing the next swath to be printed from said boundaries of said first swath; and
iii) determining a new path to be followed by the printing module corresponding to the next swath to be printed by adding the path shift to the path corresponding to the first printed swath.

Determining a plurality of boundaries of a first printed swath may comprise:
i) acquiring one or more images of said first swath from the one or more optical sensors in the local sensing suite;
ii) detecting a plurality of boundary measurements of the first printed swath from the one or more images of said first swath;
iii) deriving a probabilistic quantification of the boundary measurements from a plurality of measurement characteristics of the one or more optical sensors; and
iv) computing the boundary of said first swaths by fusing the probabilistic quantification of the boundary measurements with the one or more global measurements from the one or more global motion tracking devices.

The present disclosure provides a system for applying a livery image to the surface of an object, comprising:
i) a printing module mounted on a motion platform and configured to apply a plurality of adjacent swaths of a print material to form an image on a surface comprising:
a) one or more tanks for storing the print material,
b) a plurality of printing heads for applying the print material,
ii) a local sensing suite configured to acquire one or more images of the surface and to measure the motion of the printing module relative to the surface;
iii) one or more global motion tracking devices configured for measuring the pose of the printing module, the motion platform, and the surface of the object;
iv) a real-time processor being connected to the printing module, the motion platform, the local sensing suite, and the global motion tracking devices; and
v) an executive computer interfaced with the real-time processor.

The local sensing suite may comprise any one or combination of:
i) one or more range sensors for measuring a distance to the surface; and
ii) one or more relative motion sensors for measuring a relative motion of the printing module with respect to the surface.

The local sensing suite may comprise:
i) one or more optical sensors for acquiring one of more images of the surface.

The printing module may further comprise one or more material curing devices including UV lamps for curing the plurality of adjacent swaths of the print material.

The motion platform may comprise any one of a guiding frame, a multi-axis translation stage, a mobile vehicle, a multi-axis robotic manipulator, an actuating device, or a combination thereof.

The motion platform may comprise the translation stage, the multi-axis robotic manipulator carried by said translation stage, and the actuating device mounted on an end effector of said multi-axis robotic manipulator.

The actuating device may be decoupled from the translation stage and said multi-axis robotic manipulator carried by the translation stage, and the actuating device is controlled by a separate motion controller.

The real-time processor may be a computer programmed with instructions to fuse a plurality of measurements from the local sensing suite and the global motion tracking devices to estimate the motion of the printing module relative to the surface.

The real-time processor may be programmed with instructions to control the motion of the motion platform by receiving a pre-defined path and commanding the motion platform to follow the pre-defined path.

The real-time processor may be programmed with instructions for computing a plurality of motion correcting commands for the motion platform to maintain a desired position, orientation, and velocity of the printing module relative to the surface. The computing a plurality of motion correcting commands for the motion platform to maintain a desired position, orientation, and velocity of the printing module relative to the surface may comprise the steps of:
i) acquiring data from one or more range sensors which measure a distance to said surface;
ii) generating a 3D representation of said surface from the acquired data;
iii) computing a position, orientation, and velocity of said printing module relative to said 3D representation of the surface;
iv) fusing the pose measurements of the printing module from one or more global motion tracking devices and said position, orientation, and velocity estimation from said range data and computing a filtered position, orientation, and velocity of said printing module relative to said surface;
v) computing an error between the filtered values and the desired values of the position, orientation, and velocity of said printing module relative to said surface; and
vi) applying a plurality of motion correcting commands to the motion platform to correct said error in the position, orientation, and velocity of the printing module relative to said surface.

The real-time processor may be programmed with instructions for controlling the motion of the motion platform to align a plurality of adjacent swaths of a livery image.

The controlling the motion of the motion platform to align a plurality of adjacent swaths of a livery image may comprise the steps of:
  i) commanding the motion platform to move the printing module to a region near a first printed swath;
  ii) acquiring one or more images of the first printed swath from one or more optical sensors in the local sensing suite;
  iii) detecting a plurality of boundaries of the first printed swath from the one or more images of said first printed swath;
  iv) computing a shifted path corresponding to a next swath be printed from said detected boundaries; and
  v) controlling the motion platform to move the printing module to follow the shifted path to print the next swath.

The real-time processor may be programmed with instructions for generating a plurality of triggering signals for controlling the timing of applying printing material from the printing module to form a plurality of swaths of a livery image.

Generating the triggering signals for controlling the timing of applying printing material from the printing module to print a plurality of swaths of a livery image may comprise the steps of:
  i) receiving one or more travel distance measurements from the one or more relative motion sensors in the local sensing suite;
  ii) fusing said travel distance measurements from the one or more relative motion sensors into a fused travel distance and optionally fusing said fused travel distance with pose measurements of the printing module from one or more global motion tracking devices;
  iii) generating a triggering pulse when said fused travel distance is equal to or greater than a predetermined travel distance; and
  iv) sending the triggering pulse to the printing module wherein the triggering signals prompts the printing heads to apply a printing material.

The executive computer may be programmed with instructions to provide system management capabilities and a plurality of user interfaces.

The executive computer may further comprise:
  i) a data logger configured to log acquired data;
  ii) a safety monitor configured to generate an emergency stop alarm;
  iii) a human machine interface; and
  iv) a print controller programmed to execute one or more printing programs.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Figure 1A:
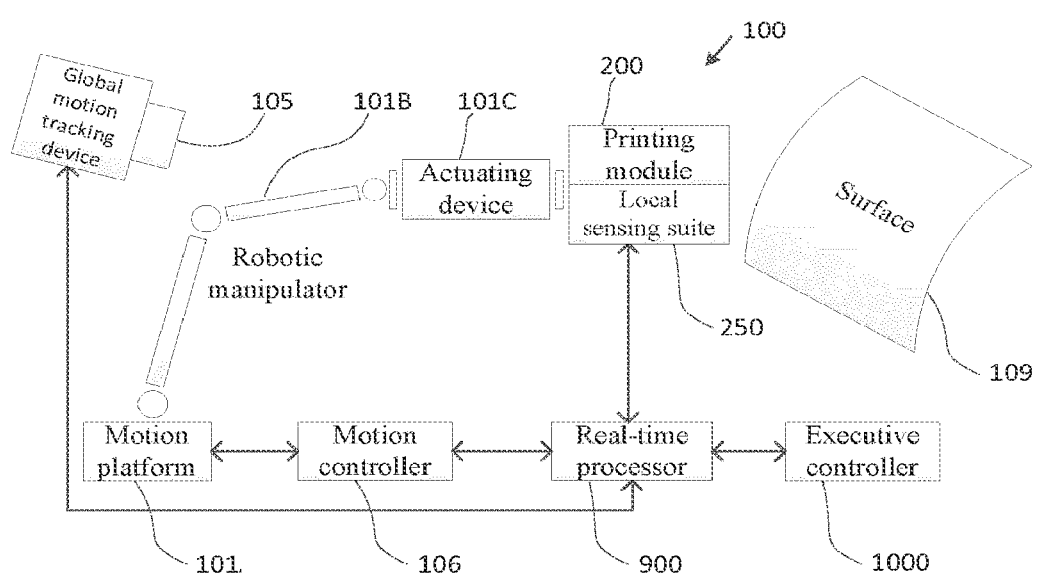
FIG. 1A shows a block diagram of an embodiment of a robotic printing system for printing an image to a surface according to an embodiment of the invention.

Various embodiments and aspects of the disclosure will be described with reference to details discussed below. The following description and drawings are illustrative of the disclosure and are not to be construed as limiting the disclosure. The drawings are not necessarily to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "motion platform" refers to a device that can carry a payload and can be controlled to move the payload in 3D space. Examples of motion platforms include guiding frames, robotic manipulators, multi-axis translation stages, unmanned ground vehicles, and any combinations of these above. It may also include actuating devices that can be controlled by a separate controller. The motion platform may be mounted on a mobile vehicle which can move it to different locations.

As used herein, the term "work envelope" or "reach envelope" refers to a 3D shape that defines the boundaries that a motion platform's end effector can reach with the platform's base fixed at one location.

As used herein, the term "position and orientation" refers to an object's coordinates with respect to a fixed point together with its alignment (or bearing) with respect to a fixed axis. For example, the position and orientation of a motion platform might be the coordinates of a point on the motion platform together with the bearing of the motion platform (e.g., in degrees). The term "pose" is used interchangeably as a short form for "position and orientation".

As used herein, the term "path", "the path of the motion platform", or "the path of the printing module" refers to a sequence of poses (i.e., position and orientation) of the end effector with respect to the motion platform's base, the sequence of which defines an end effector trajectory of "path". As used herein, the term "swath" refers to a continuous portion of an image. It may also refer to the corresponding area of a surface, on which a swath of an image will be printed.

As used herein, the term "tracking device" refers to a device that measures up to the six degrees of freedom (position and orientation) of an object which is being tracked.

As used herein, the term "registration" or "pose registration" refers to the process of finding the transformation between two coordinate frames associated with two objects. For example, registering an object to the motion platform refers to the process of finding the transformation from a coordinate frame attached to the object to a coordinate frame attached to the motion platform's base.

The present disclosure relates to a robotic printing system for printing livery images on a surface of an object. As required, preferred embodiments of the invention will be disclosed, by way of example only, with reference to drawings. It should be understood that the invention can be embodied in many various and alternative forms. In other instances, well-known methods, procedures, and components have not been described in detail so as not to obscure the embodiments described herein. Also, the description is not to be considered as limiting the scope of the embodiments described herein.

The robotic printing system as claimed provides a beneficial solution for creating high-resolution livery designs on the surface of 3D objects, especially on very large objects with irregular geometric shapes. The motion platform of this system enables a large and flexible workspace for printing on objects with various shapes and structures. Multiple local sensors in this system can directly measure the printing module's motion relative to the surface of the object being printed on. The motion feedback enables the printing system to achieve high motion accuracy for controlling the motion of the printing module relative to the target surface, which allows the system to print images on a 3D object at high resolution.

In addition to the local sensors, the system uses one or more global motion tracking devices to measure the pose of various modules of the system in a global reference frame. The fusion of both local and global measurements reduces the drifting effect of local sensors, thus further improving the motion accuracy of the overall system. More importantly, this ensures the consistency of high motion accuracy of the system in a global reference frame even when the robotic printing system periodically moves its base to different locations. This allows the system to expand its overall work envelope by moving to multiple locations, thereby enabling it to print a high-resolution image seamless on a very large object.

In addition to livery printing, the aforementioned method can be applied to other large object surface operations which involve moving the actuating module along the object surface at a precise standoff distance, relative orientation and/or speed, in which high motion accuracy and coordination between the motion platform and actuating module with respect to the object's surface is necessary. Large object surface operations include surface cleaning, sanding, finishing, priming, coating and de-coating. In the following sections, the term printing should be understood as any of the aforementioned operations.

The structure of the system for applying a livery design of an image to the surface of an object will first be described.

Referring to FIG. 1A, the robotic printing system 100 for printing an image to a surface 109 is shown generally. The robotic livery printing system 100 shown in FIG. 1A uses a motion platform 101 to carry a printing module 200 which applies printing materials for the application of livery patterns on a surface. In this particular embodiment, the motion platform 101 consists of a multi-axis translation stage 101A, an articulated robot manipulator 101B, and an actuating device 101C. The printing module 200 is mounted on the actuating device 101C. A local sensing suite 250 is installed next to the printing module 200 for sensing the printing module's motion relative to the surface of the object 109. The global motion tracking device 105 is a device which measures the six DOF position and orientation of an object being tracked. In an embodiment, the global motion tracking device 105 is a laser-based coordinate-measuring machine that measures a six DOF position and orientation of an object by tracking one or more reflective markers mounted on the object. An additional embodiment of a global motion tracking device is a multi-camera system which is capable of simultaneously tracking multiple objects, where each object carries a unique identification marker. In this particular embodiment, the global motion tracking device 105 is used to measure a time-instant specific position and orientation of the base of the motion platform 101, the printing module 200, and the surface of the object 109 with respect to a global reference frame attached to the environment.

A motion controller 106 is interfaced with the motion platform 101 for controlling the motion of the motion platform 101 relative to the surface 109 using feedback provided by the local sensing suite 250 and the global motion tracking device 105.

In the various embodiments of the printing system, the motion platform 101 may be any one of a guiding frame, a multi-axis translation stage, a mobile vehicle, a multi-axis robotic manipulator, an actuating device, or a combination of any of these modules.

In an embodiment, the motion platform 101 comprises an automated guided vehicle (AGV) and an industrial robotic manipulator which is carried by the AGV. The motion of the AGV and the manipulator can be controlled in a coordinated or decoupled manner by a motion controller.

In an additional embodiment, the motion platform 101 comprises a multi-axis translation stage and an industrial robotic manipulator which is carried by the stage. The motion of the stage and the manipulator can be controlled in a coordinated or decoupled manner by a motion controller.

Figure 1B:
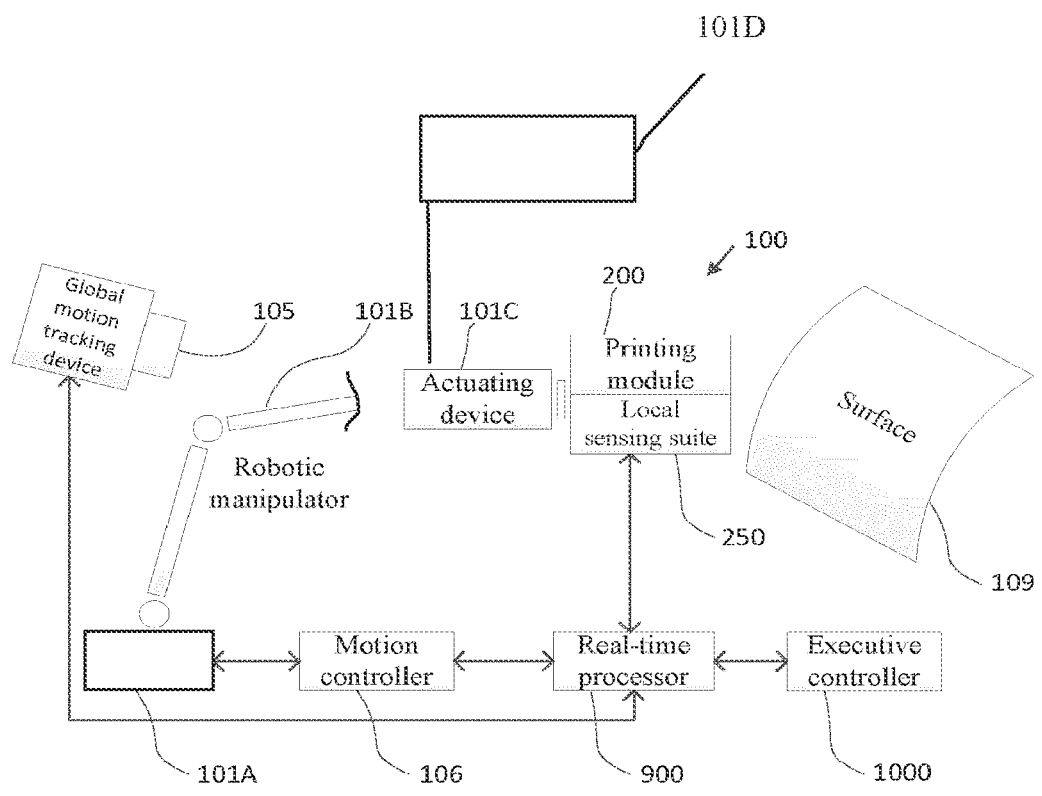
FIG. 1B shows a block diagram of another embodiment of a robotic printing system for printing an image to a surface according to an embodiment of the invention.

Specifically, in an embodiment actuating device 101C is decoupled from the translation stage 101A and the multi-axis robotic manipulator 101B carried by the translation stage 101A, and the actuating device 101C is controlled by a separate motion controller 101D, see FIG. 1B.

In an additional embodiment, the motion platform 101 may further include an actuating device mounted to an end effector of the robotic manipulator. The motion of the actuating device can be controlled in a decoupled manner at a different rate by a separate controller.

The real-time processor 900 is a computer running a real-time operating system, said computer being interfaced with said printing module 200, said local sensing suite 250, said motion controller 106, and said global motion tracking device 105, and being programmed with instructions to process and fuse sensor measurements, control the motion of the motion platform 101, and manage the printing process of the printing module 200. The executive controller 1000 is a computer, programmed with instructions to provide a user interface and system management capabilities, said computer being interfaced with the real-time processor 900.

Figure 2:
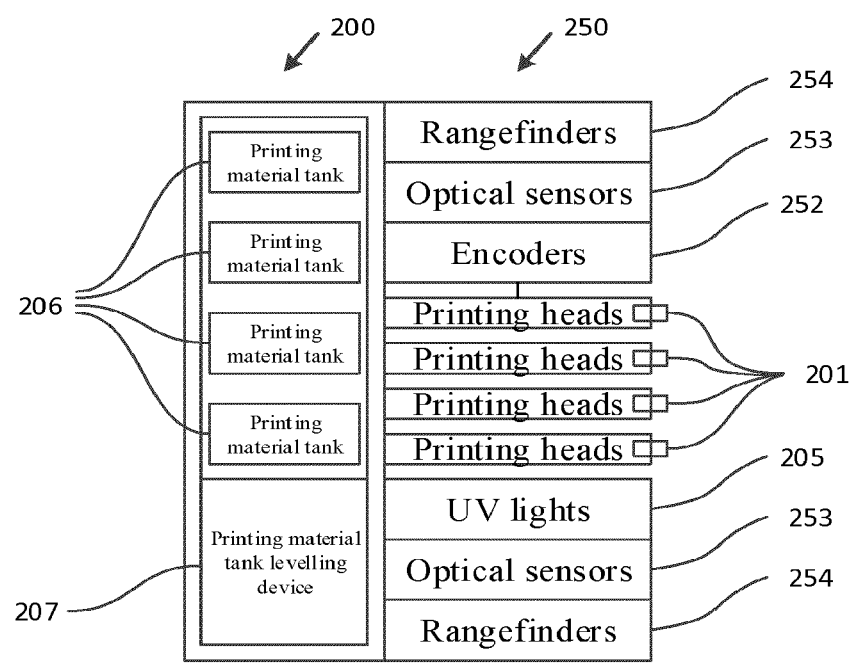
FIG. 2 shows a diagram of a printing module for applying printing materials and sensing suite for measuring positional properties of a surface according to one embodiment of the invention.

Referring to FIG. 2, a diagram of the printing module 200 for applying printing materials is shown according to one embodiment of the invention. The local sensing suite 250 for sensing a surface 109 is also shown according to one embodiment of this disclosure. The printing module 200 comprises a plurality of printing heads 201 that are connected to a plurality of printing material tanks 206 for ejecting printing materials of one or more colors.

In an embodiment, the printing module 200 also includes an printing material tank levelling device 207, said printing material tank levelling device 207 being interfaced with the printing material tanks 206 and being configured to maintain the position and orientation of the printing material tanks 206 relative to the printing heads 201 within a predefined range.

In an additional embodiment, the printing module 200 may also include one or more ultraviolet (UV) light sources 205 positioned proximate to the printing heads 201 and operable to project UV radiation towards a surface 109 in order to accelerate polymerization of a UV curable ink.

In the various embodiments of the printing module 200, the printing heads 201 may be replaced by one of the inkjet, laser, LED, solid-ink, dye-sublimation, thermal based printing head, or a combination of them for applying printing materials on to the object's surface 109 using different printing technologies.

The local sensing suite 250 generally comprises one or more relative motion sensors 252, one or more optical sensors 253, and one or more range sensors 254. The one or more relative motion sensors 252 are connected to the printing heads 201 for measuring the motion of the printing module 200 relative to a surface 109 and generating triggering signals that control the timing of ejection of the printing material from the printing heads 201. The printing material includes materials such as inks or paints. The one or more optical sensors 253 are coupled to the printing module 200 and operable to observe printed and unprinted areas of a surface 109. The one or more range sensors 254 are installed next to the printing module 200 and operable to scan the profile of a surface 109.

In an embodiment, the range sensors 254 are laser rangefinders that use lasers to measure distance. The measurement method includes methods such as time-of-flight, phase difference and triangulation. The relative motion sensors 252 may include any of one or more wheel encoders travelling on the surface, one or more non-contact optical sensors estimating relative motion, one or more non-contact (e.g., capacitive) sensors estimating relative motion, or a combination of thereof. It will be understood by one of skill in the art that the range sensors and relative motion sensors may comprise additional or alternative sensors, which are capable of measuring distance changes in real-time.

The method for controlling the printing system to print a livery image on an object surface generally includes multiple operational steps. First, an off-line programming step is completed for acquiring sensor data, generating a 3D representation of the surface, dividing the livery image into a plurality of swaths, and generating a plurality of paths corresponding to the plurality of swaths for the printing module to follow. The paths generated in the off-line programming step will be used as pre-planned paths to guide the motion platform to move the printing module during the printing execution step.

Printing material application commands for printing a given image on a specified surface are also formed in this pre-printing step. A printing preparation step prepares the surface for receiving print material and the printing module for following the pre-planned paths. After the preparation step, the printing of the print material is executed by controlling the motion platform to move the printing module and by generating triggering signals (described later) to control the timing of applying the printing material from the printing module to form a plurality of swaths of an image.

Figure 3:
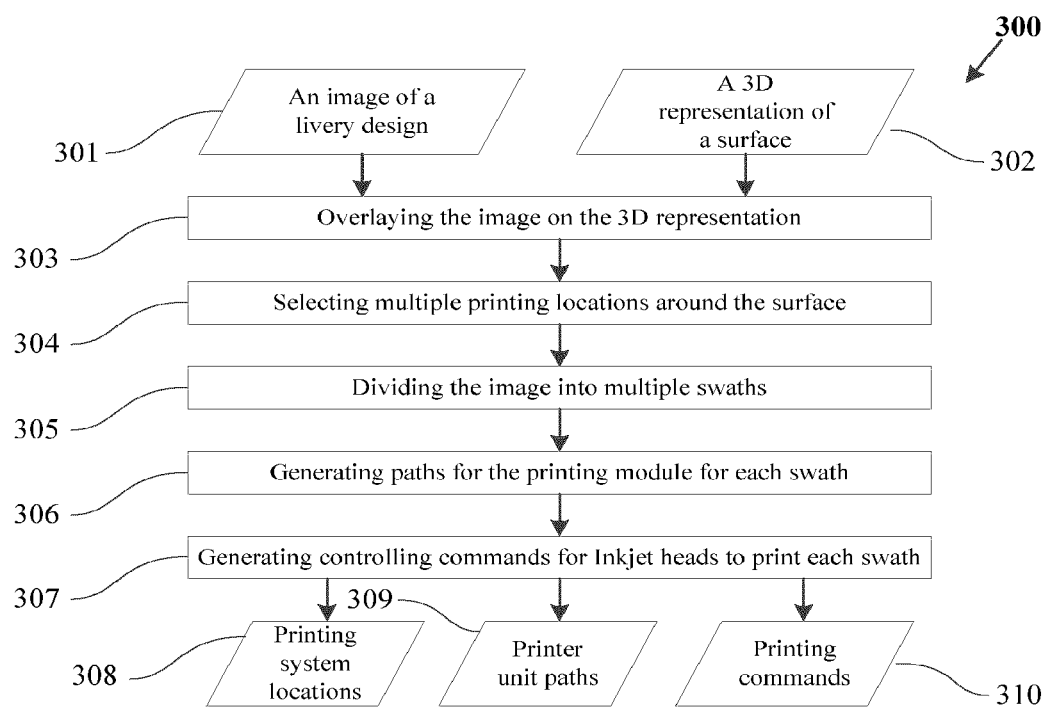
FIG. 3 is a block diagram representing the operational steps of off-line programming for generating paths for a motion platform

An embodiment of the operational, off-line programming step is shown in FIG. 3, where the off-line programming step generates paths to guide a motion platform to move a printing module relative to the surface of an object. The more specific workflow steps of the off-line programming step 300 include several sub-steps that facilitate overlaying the image of a livery design onto a 3D representation of the surface and dividing the image to be printed into multiple swaths. For printing a livery image on a large surface, it is advantageous to divide the livery design into multiple swaths and print the image in a swath-by-swath process. The motion platform may move its base after printing each or a few swaths, depending on the size of each swath, the surface geometry, and the printing scheme.

The sub-steps of the off-line programming step are as follows: sub-step 303 involves the overlaying of an image 301 of a livery design on the 3D representation 302 of the target surface. The 3D representation of the surface can be imported from a computer file. It can also be generated by sensor data of the surface acquired by the local sensing suite and the global motion tracking devices of the robotic printing system. In addition, sub-step 304 includes the process of determining if it is beneficial or necessary for the printing system to reach the entire surface from multiple locations rather than one single location and, if it is deemed to be beneficial or necessary, selecting a plurality of locations around the surface for the printing system to reach the entire surface. In the sub-step 305, the livery image 301 is divided into multiple swaths.

After the image to be printed is divided into multiple swaths, multiple paths corresponding to the multiple swaths are produced in sub-step 306, wherein each path will guide the motion platform to move the printing module to print a corresponding swath of the image. Once the swaths and paths are generated, controlling commands are generated in sub-step 307 for the printing module 200 to start or stop applying the printing material on the surface of the object. The next sub-step outputs the results of the off-line programming step, including a plurality of printing locations 308 for the printing system 100, pre-planned paths 309 that the printing module 200 will follow to print a plurality of swaths of the image, and printing commands 310 which starts or stops the ejection of the print material from the printing module 200.

Figure 4:
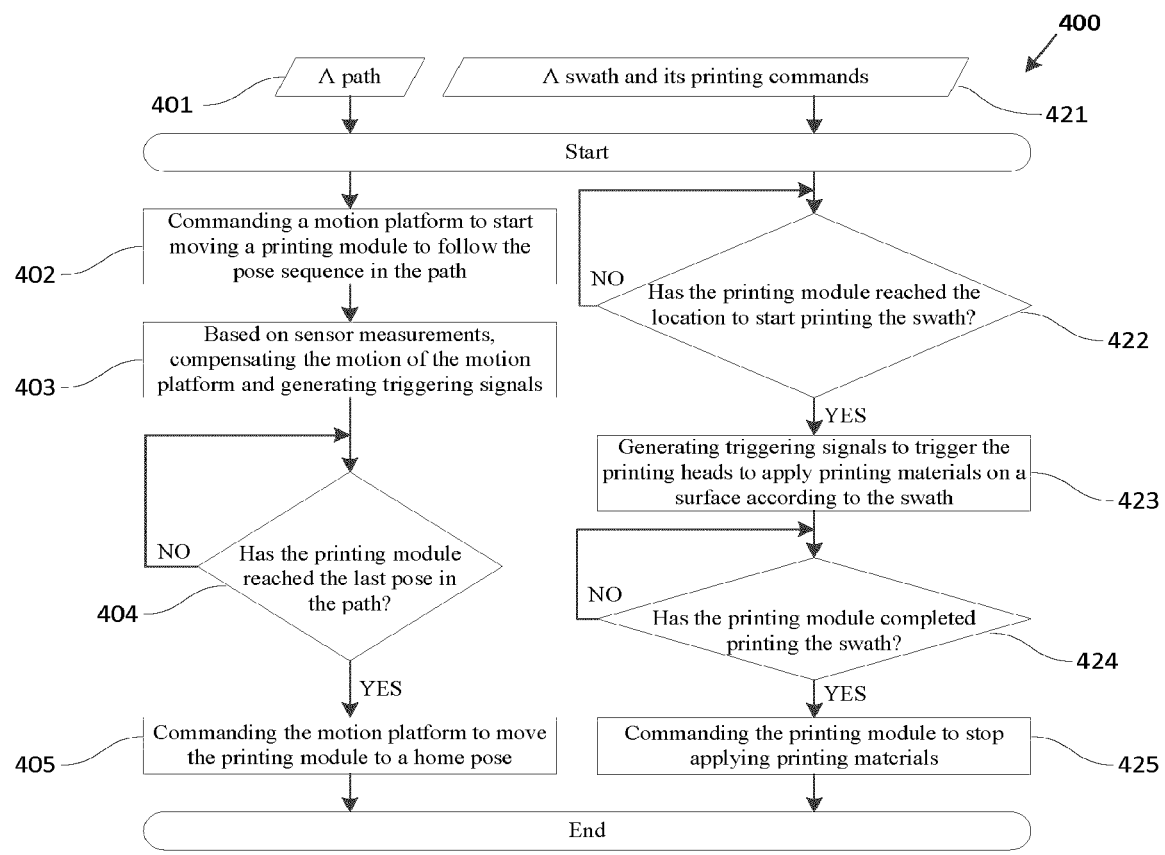
FIG. 4 shows the operational steps of the pre-printing and printing execution for one swath according to one embodiment of the invention.

Referring to FIG. 4, an embodiment of the operational steps of the pre-printing and printing execution for one swath is shown. Specifically, the workflow of the pre-printing and printing execution steps 400 comprises several sub-steps which include the uploading of a pre-planned path 401 to the motion controller 106 of the motion platform 101 and the uploading of a specific swath 421 of the livery image 301 to the printing module 200. The operational steps of the pre-printing and printing execution include two separate, parallel control threads. The first thread commands the motion platform 101 to move a printing module 200 to follow the pre-defined path 401 in sub-step 402. While following said pre-defined path 401, the first thread estimates the position, orientation, and velocity of the printing module 200 relative to the surface 109 based on measurements acquired by the local sensing suite and the global tracking device and uses the estimated position, orientation, and velocity as feedback to control the motion platform to maintain a desired position, orientation, and velocity of the printing module 200 relative to a surface 109. Sub-step 403 first fuses measurements obtained by various sensors in the local sensing suite and further fuses these measurements with measurements obtained by the global motion tracking devices into a first measurement product, which includes the position, orientation, and velocity of the print module with respect to the surface. Afterwards, this first measurement product is compared to the desired value of the position, orientation, and velocity of the printing module relative to the surface, and the error is used as motion feedback to generate correcting commands for the motion platform to maintain a desired position, orientation, and velocity of the printing module relative to the surface. Sub-step 404 checks the position of the printing module along the path 401 that the module is commanded to follow. Once a full path of a printing operation is completed, the printing module is moved to a home position by the motion platform in sub-step 405.

The second thread controls the printing execution step whereby the timing of applying printing materials by the printing heads 201 in the printing module is controlled to apply printing material according to the swath 421. The second thread includes multiple sub-steps in the execution of the printing of the printing material. Specifically, the first sub-step 422 involves the system determining if the printing module 200 has reached the position to start printing said swath 421. In the next sub-step 423, a triggering signal is generated for controlling the timing of applying printing material from the printing heads 201 in the printing module 200. The triggering signal is generated by fusing the measurements from the one or more relative motion sensors 252 in the local sensing suite 250 or by fusing the measurements from the one or more relative motion sensors 252 in the local sensing suite 250 and the measurements from the one or more global motion tracking devices 105 into a second measurement product, which includes the travelled distance by the printing module 200 relative to the surface since the previous instance of the triggering signal. When the travelled distance equals or exceeds a prescribed distance, a new triggering signal is generated and sent to the printing module 200 to prompt the applying of the printing material according to the swath being printed. In addition, sub-step 424 monitors the printing progress and determines if the printing module 200 has completed printing this swath 421. Lastly, if the printing module 200 is found in sub-step 424 to have finished printing the specific swath 421, sub-step 425 will then be executed whereby the printing module 200 is commanded to suspend applying the printing material.

In the final operating step, a post-printing step is executed which involves the servicing of the printing module and the motion platform.

During a printing task, the printing module carried by said motion platform must maintain desired position, orientation, and velocity with respect to a surface in order to ensure the quality of printing results. Therefore the motion of said motion platform in following a pre-defined path is augmented during the printing procedure using sensor inputs to compensate for:
   a) model mismatches between the real surface and its 3D model that is used for path planning;
   b) registration errors between said motion platform and said surface;
   c) path following errors between the actual and desired path of the motion platform; and
   d) velocity variations along the primary printing direction for generating triggering signals.

Figure 5:
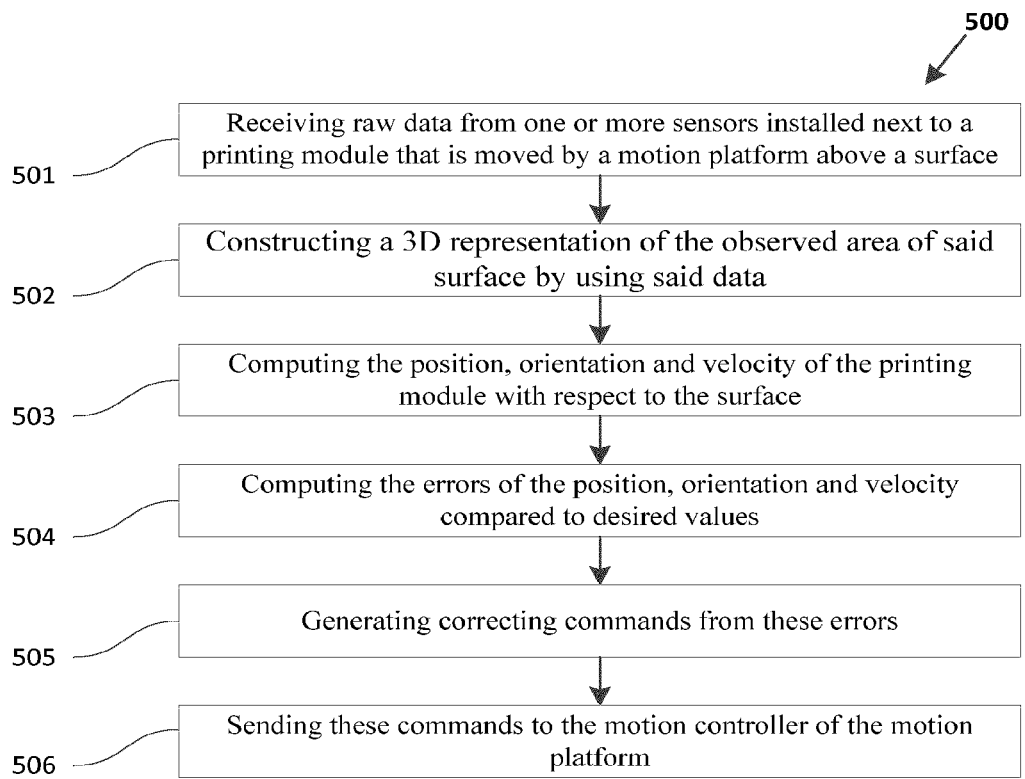
FIG. 5 shows the operational steps of maintaining the desired position and orientation of a printing module with respect to a surface according to one embodiment of the invention.

Referring to FIG. 5, the workflow of the operational steps 500 for maintaining the desired pose (i.e., position and orientation) and velocity of a printing module with respect to the surface of an object is shown. At step 501, the real-time processor 900 acquires raw data from one or more range sensors 254 in the local sensing suite 250; at step 502, said real-time processor 900 constructs a 3D representation of the observed area of said surface by using said range data; at step 503, said real-time processor 900 computes the position, orientation, and velocity of said printing module 200 with respect to said 3D representation of said surface; at step 504, said real-time processor 900 fuses said position, orientation, and velocity with the pose measurement obtained by the global motion tracking device 105; at step 505, said real-time processor 900 computes the errors of said position, orientation, and velocity with respect to their desired values; at step 506, said real-time processor 900 generates control commands from said errors; and at step 507, said real-time processor 900 sends said control commands to said motion controller 106 that controls the motion of said motion platform 101 to minimize said errors between the actual and desired motion of the motion platform 101.

In an embodiment of the printing system, the six DOF motion of the motion platform is decoupled, and each degree of motion is controlled separately. To maintain the printing module's standoff distance to the surface and ensure the printing heads (a non-limiting example being an inkjet printing head) are perpendicular to the surface, this system makes use of one or more range sensors in the local sensing suite to measure the standoff distance and the pitch and yaw angle of the printing module relative to the surface. In this embodiment, data is acquired from the one or more range sensors in the local sensing suite, which are configured to measure the distance to said surface. A three-dimensional representation of the surface is then constructed using information from the range sensor data. Using this three-dimensional representation, the position and orientation of said printing module relative to the three-dimensional representation of said surface can be computed. The velocity of the printing module relative to surface can then be calculated by determining the change of its position and orientation from the previous time instant.

Other degrees of motion of the printing module can be similarly regulated by feedback provided by the global motion tracking devices and the local sensing suite. In one non-limiting example, the roll angle of the printing module relative to the surface of an object can be controlled with feedback of the printing module's orientation relative to the surface measured by the local sensing suite and feedback of the object's pose measured by the global motion tracking device. In an additional example, the two other translational DOF of the printing module's movement relative to the surface can be regulated with feedback provided by the global motion tracking device and the local sensing suite.

Livery printing requires highly accurate, high-frequency triggering signals to control the timing of the printing heads to apply the correct type and amount of printing material for a given image pattern at the correct time at the right spot on a surface. The triggering signal for the printing head is implemented to aid in synchronizing the timing of applying printing material from the printing module with the motion of the printing module.

In an embodiment, the triggering signals can be generated through dead reckoning. By assuming the motion platform moves the printing module at a constant speed with respect to a surface; a time-paced pulse sequence can serve as the triggering signal.

In an additional embodiment, a distance-paced signal can be generated according to the motion of the motion platform, which can be estimated from the measurements of its built-in joint encoders and its forward kinematics. In some applications, these two approaches do not provide sufficient motion accuracy to achieve high quality printing. Typical accuracy of industrial robots is in the range of millimetres, while high-quality printing requires sub-millimetre accuracies.

In an additional embodiment, one or more relative motion sensors in the local sensing suite are used to measure the travel distance of the printing heads relative to a surface. The relative motion sensors may include any of one or more wheel encoders travelling on the surface, one or more non-contact optical sensors estimating relative motion, one or more non-contact capacitive sensors estimating relative motion, or a combination of thereof. Any measuring error of the relative motion sensors which occurs or accumulates through this particular embodiment may be further corrected by pose measurements obtained by a global motion tracking device. The global motion tracking device can be mounted at a fixture for measuring the pose of the printing module carried by the motion platform in a global reference frame. In some implementations, the global motion tracking device can be mounted on the motion platform. In this scenario, the global motion tracking device calculates its pose with respect to a global reference frame associated with the environment by measuring the pose of one or more markers attached to fixtures in the environment.

Figure 6:
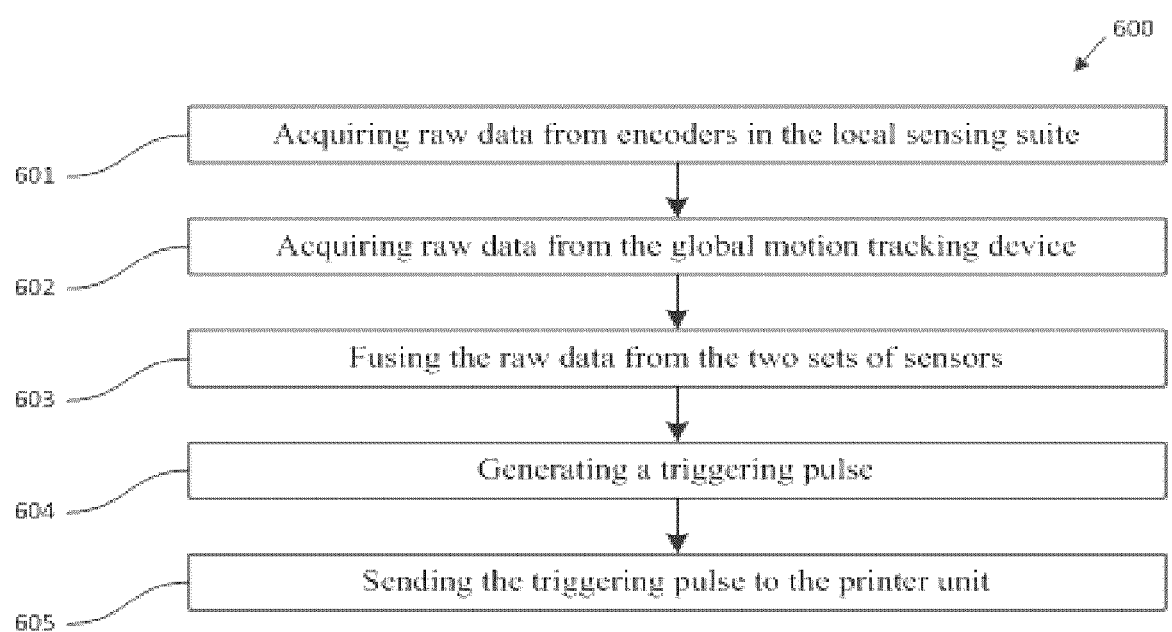
FIG. 6 shows the operational steps of generating triggering signals according to one embodiment of the invention.

Referring to FIG. 6, the workflow 600 of generating highly accurate triggering signals by using one or more relative motion sensors and a global motion tracking device is shown. At step 601, said real-time processor 900 acquires measurements from one or more relative motion sensors for measuring the travel distance of the printing module relative to a surface; at step 602 said real-time processor 900 acquires pose measurements from said global motion tracking device 105 for tracking the pose of the printing module 200 in a global reference frame; at step 603, said real-time processor 900 fuses said measurements from the two sets of sensors to estimate the travel distance of the printing module 200 relative to the surface, and at step 604, said real-time processor 900 generates a triggering pulse when the travelled distance of the printing module 200 is equal to or greater than a prescribed distance since the previous instance of the triggering signal; and step 605, said real-time processor 900 sends the triggering pulse to the printing module 200.

As discussed above, the livery image may be applied using a method of dividing the image into multiple swaths, where each individual swath is printed on an incremental, "swath-by-swath" basis. In order to create a continuous, seamless, and undistorted livery, adjacent swaths must be properly aligned. The correct alignment of the swaths is dependent on several conditions. First, the location of the livery design on the surface must be accurately registered to the motion platform. In other words, the pose of the livery design is preferably, accurately defined in the motion platform's base coordinate frame, in which the motion platform's motion is controlled. Second, the first swath must be accurately printed at the correct location of the surface as it may be used as a reference for printing following swaths. Third, the motion of the printing module must be accurately controlled to start printing each swath at the correct location and to maintain a desired shift relative to the previous swath for printing the current swath.

In the various embodiments of the printing system, the registration between the motion platform and the desired location of a livery image on a target surface is achieved by the following steps:

a) overlaying the livery image on a 3D presentation of the surface;

b) using the global motion tracking device to measure the pose of a portion of the surface, on which the livery image is overlaid, and the pose of the motion platform by tracking markers placed on the surface and the motion platform; and c) computing the relative pose between the motion platform and each swath of the livery design.

Using the registration information, the trajectory of the motion platform can be controlled to accurately print the first swath. In an embodiment, the motion of the motion platform is controlled by sequential feedback from joint encoders build into the motion platform and a kinematic model of the motion platform.

In another embodiment, artificial features such as laser lines and semi-visible pigmented inks are placed on the surface. Optical sensors in the local sensing suite are then employed to provide feedback for the motion platform through tracking these artificial features. In another embodiment, a global motion tracking device is used to measure the pose of the printing module in a global reference frame, and such pose measurements are fed to the motion platform as control feedback to control its motion to accurately print the first swath.

Various embodiments of motion control of the motion platform may also be implemented to accurately align a swath relative to previously printed swaths. In one embodiment of swath alignment, the motion control incorporates the aforementioned feedback from the built-in joint encoders and a kinematic model of the motion platform.

In another embodiment, a global motion tracking device is used to measure the pose of the printing module in a global reference frame, and these pose measurements are provided to the motion platform as control feedback to control its motion to accurately align a second swath to previously printed swaths. In another embodiment, a coded pattern is simultaneously printed beside a swath and serves as a guiding cue for the motion platform to print the next swath. In the various embodiments, the motion platform may use one or more optical sensors in the local sensing suite to observe the previously printed swaths.

Figure 7:
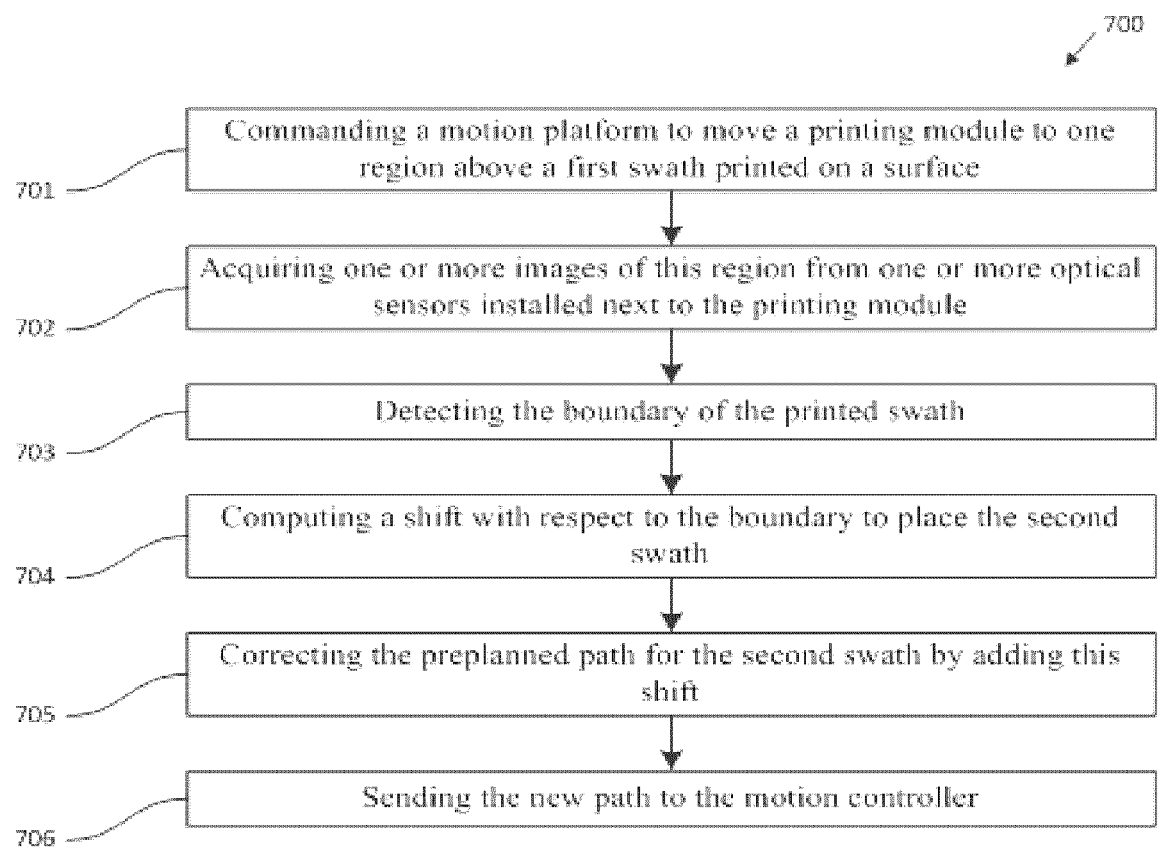
FIG. 7 shows the operational steps for aligning two adjacent swaths according to one embodiment of the invention.

Referring to FIG. 7, the operational steps 700 for aligning two adjacent swaths according to one embodiment of the invention are shown and described herein. The method for controlling the motion platform to align a swath to a previously printed swath includes the step of 701 commanding said motion platform 101 to move said printing module 200 to a location above one region of said printed swath; step 702 acquiring one or more images of said printed swath by using the optical sensors 253; step 703 detecting the boundary of said printed swath in said images; step 704 computing a shift for placing said new swath; step 705 calculating a path for the printing module 200 to print said new swath by adding the shift to the path of said printed swath; and step 706 sending said path to said motion controller 106 for controlling the motion platform 101 to move the printing module 200 to follow said path during printing said new swath.

Figure 8:
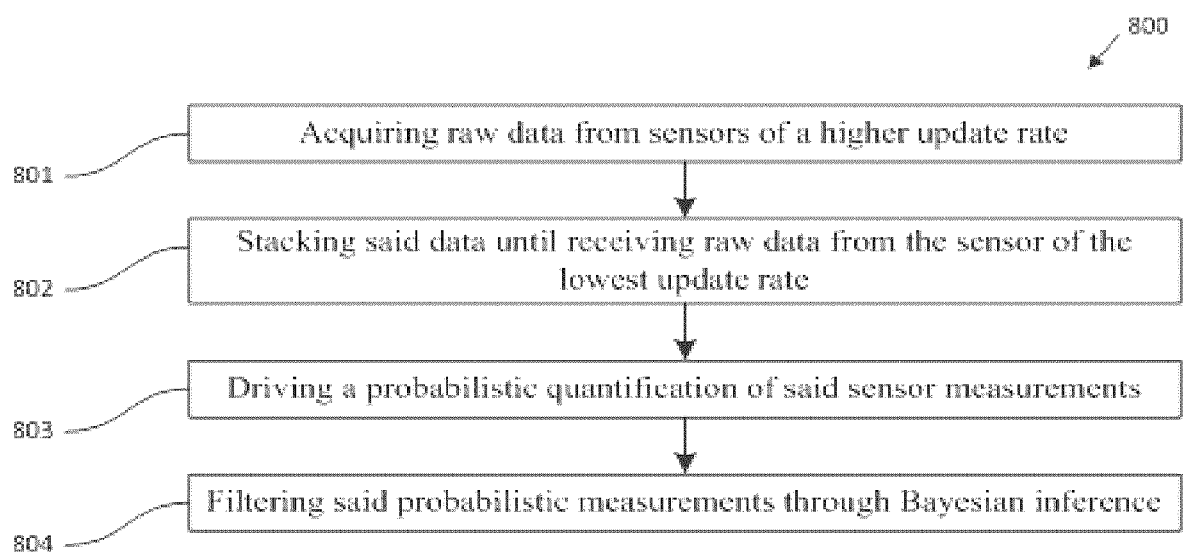
FIG. 8 shows the operational steps for fusing multiple sensors according to one embodiment of the invention.

In the various embodiments of the system presented herein, fusing the measurements from the global motion tracking devices and the local sensing suite is required to provide accurate motion feedback for improving the motion accuracy of the motion platform, generating highly accurate triggering signals, and ensuring proper swath alignment. Referring to FIG. 8, a non-limiting example of a series of workflow steps 800 for achieving multi-sensor fusing of a variety of sensor measurements is shown. At step 801, the real-time processor 900 acquires measurements from sensors of high update rate. At step 802 the real-time processor 900 stacks said sensor measurements until it receives a measurement from a sensor of the lowest update rate. At step 803, the real-time processor 900 derives a probabilistic quantification for the measurements from each sensor. At step 804, the real-time processor 900 feeds all probabilistic measurements to a Bayes filter to reduce the uncertainties in the measurements. In one embodiment, the Bayes filter models the uncertainties in the probabilistic measurements by a probability density function and recursively updates the probabilities of a plurality of beliefs of the measurements. In another embodiment, the Bayes filter models the uncertainties in the probabilistic measurements by a set of discrete samples of measurements and recursively updates the probabilities of a plurality of beliefs of the measurements.

Figure 9:
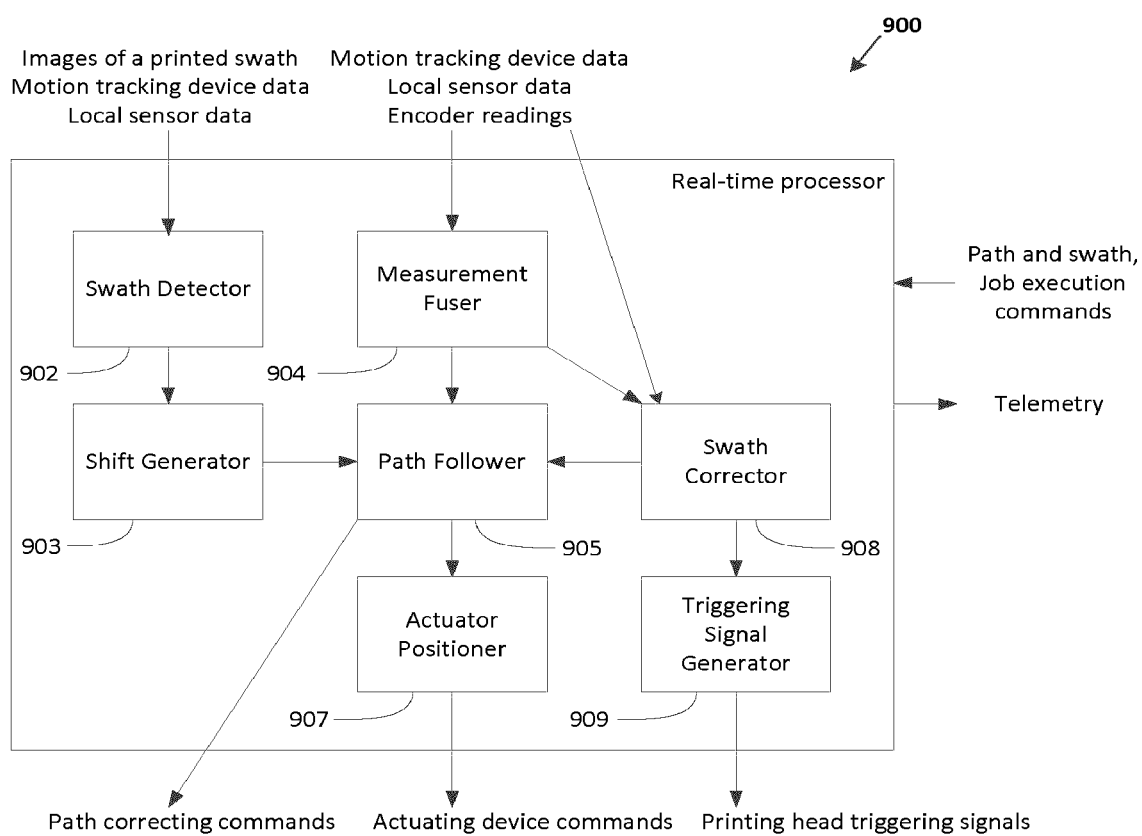
FIG. 9 shows a flow diagram of the real-time processor according to one embodiment of the invention.

FIG. 9 provides a non-limiting example of an embodiment of a software implementation of the real-time processor 900. The processor 900 is programmed for aligning a second swath to a first swath which is already printed on the surface of the object. The swath detector 902, is capable of locating a first, already printed swath from images of the surface acquired by the optical sensors 253 in the local sensing suite 250 and using a variety of image processing techniques (e.g., edge detection, pattern matching, object recognition) to determine the boundaries of the first printed swath. The shift generator 903 is configured to then compute a shift that should be applied to the desired path for aligning the second swath with respect to said first swath. The robotic printing system may then follow the operation steps according to FIG. 4 to print a next swath to be printed.

While the printing module 200 is moved by the motion platform 101 along a path to print a swath, the measurement fuser 904 filters and fuses measurements from the global motion tracking device 105 and the local sensing suite 250 to estimate and track the motion (i.e., position, orientation, speed, and/or direction) of the printing module 200 with respect to the surface. The path follower 905 compares the measured motion of the printing module 200 with the desired motion and generates correcting commands that should be applied to the motion of the motion platform to correct the difference between the measured and desired motion of the printing module 200 relative to the surface. Regarding the estimation and tracking of the motion of the printing module 200 relative to a surface, the process by which the position and orientation is estimated is as follows:

Range data is acquired from range sensors in the local sensing suite, and pose measurements are acquired from the one or more global motion tracking devices. The range and pose measurements are then used to register a relative pose of the surface of the object, the mobile platform, and the printing module to a global reference frame. A 3D representation of the surface is then constructed from the range data of the surface, and a location and orientation of the range sensors in said 3D representation of said surface is computed. This representation enables the computation of a probabilistic quantification of the pose measurements from one or more measurement characteristics of the one or more range sensors and the global motion tracking devices to transform said probabilistic pose measurements of said mobile platform carrying the printing module relative to said surface into the global reference frame.

The path correcting commands for the motion platform 101 are sent to the motion controller 106 to guide the motion platform 101 to move the printing module 200 along said path. In some embodiments, the actuating device 101C in the motion platform 101 is controlled separately at a different rate for path correction. In this scenario, the actuating device commands are generated by the actuator positioner 907 and sent to the actuating device 101C directly. The swath corrector 908 also uses the fused information to compare said measured motion of the printing module 200 to the desired motion for the current swath of a livery image and adjusts the frequency of the triggering signals to be sent to the printing heads 201 by the triggering signal generator 909. The swath corrector 908 may receive the local sensor data directly, at the highest frequency available, and fuses it with the output of the measurement fuser 904 to generate triggering pulses for the printing heads 201. Telemetry data and sensor measurements from the printing module 200, the local sensing suite 250, the motion platform 101, and the global motion tracking device 105 are collected and sent to the executive controller 1000 for visualization and logging.

Figure 10:
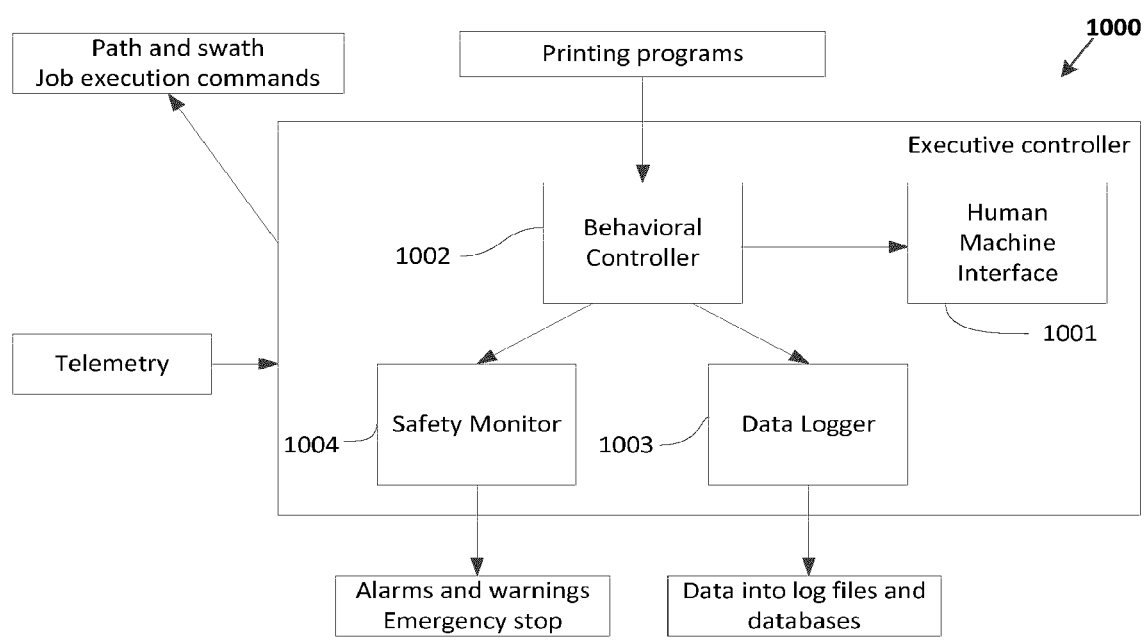
FIG. 10 shows a block diagram of the executive controller according to one embodiment of the invention.

Referring to FIG. 10, a block diagram of the software architecture of the executive controller 1000 according to an embodiment is shown. The executive controller 1000 receives operational commands from an operator and monitors the status of other modules of the robotic printing system 100. The human machine interface 1001 provides various graphical views of live and historical data reported by the robotic printing system 100 to the operator. The operator can select a printing program to be executed by the system and can control the program's execution (e.g., start, stop, pause, and resume) through the tools provided by the human machine interface 1001. The behaviour controller 1002 loads the selected printing programs into the real-time processor 900 for printing the swaths specified in said printing programs. The data logger 1003 can log one or more types of the input and output data from the printing module 200, the local sensing suite 250, the motion platform 101, the global motion tracking device 105, the real-time processor 900, the executive controller 1000, and the associated computer systems. Logged data may be written into and stored in various storage mediums, such as computer memory, local hard drives, and external databases for both runtime access and post-operation analysis. The safety monitor 1004 can monitor one or more types of said input and output data, check system errors and violation of safety conditions (e.g., collision, low on printing material supply, loss of power, device failure, out of calibration), provide notifications (e.g., audible and/or visible alarm, warning message) to the operator, and slow down or stop the system's motion in the occurrence of an emergency.

The various instructions for completing the methods of printing a livery design may be stored in a computer readable storage medium by itself. In addition, the methods for printing the swaths, aligning swaths, maintaining the position and orientation of the print module, and incorporating and fusing global and local measurements may be combined into a single package and may be stored in combination on a computer readable storage medium.

At least some of the elements of the systems described herein may be implemented by software, or a combination of software and hardware. Elements of the system that are implemented via software may be written in a high-level procedural language such as object oriented programming or a scripting language. Accordingly, the program code may be written in C, C++, C #, JavaScript, SQL, or any other suitable programming language and may comprise modules, classes, or other functional units of code as will be appreciated by those skilled in the art. At least some of the elements of the system that are implemented via software may be written in assembly language, machine language, or firmware as needed. In any case, the program code can be stored on a storage media or on a computer readable medium that is readable by a general or special purpose programmable computing device having a processor, an operating system, and the associated hardware and software that is necessary to implement the functionality of at least one of the embodiments described herein. The program code, when read by the computing device, configures the computing device to operate in a new, specific and predefined manner in order to perform at least one of the methods described herein.

Furthermore, at least some of the methods described herein are capable of being distributed in a computer program product comprising a computer readable medium that bears computer usable instructions for execution by one or more processors, to perform aspects of the methods described. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

In summary, in an embodiment, the present disclosure provides a method for printing a livery image on a surface of an object and for use in association with a motion platform, the method comprising the steps of:
v) acquiring data from a local sensing suite;
vi) acquiring data from one or more global motion tracking devices;
vii) creating a first measurement product by fusing said acquired data from said local sensing suite and said one or more global motion tracking devices to control the motion platform to move a printing module across said surface; and
viii) creating a second measurement product by fusing said acquired data from said local sensing suite and said one or more global motion tracking devices to control the timing of ejection of the print material from said printing module.

In an embodiment, the local sensing suite comprises any one or combination of:
iii) one or more range sensors for acquiring range data of the surface; and
iv) one or more relative motion sensors for measuring relative motion of the printing module with respect to the surface.

In an embodiment, the local sensing comprises:
ii) one or more optical sensors for acquiring one of more images of the surface.

In an embodiment, the one or more relative motion sensors for measuring relative motion of the printing module with respect to the surface comprise any of one or more wheel encoders travelling on the surface, one or more non-contact optical sensors estimating relative position or velocity, one or more non-contact capacitive sensors estimating relative motion, or a combination of thereof.

In an embodiment, the step of creating a first measurement product by fusing said acquired data from said local sensing suite and said one or more global motion tracking devices comprises the steps of:
viii) acquiring range data from one or more range sensors in the local sensing suite for measuring the distance of the printing module relative to a surface;
ix) acquiring position and orientation measurements of the printing module and the surface from the one or more global motion tracking devices;
x) constructing a 3D representation of the surface by said data from the range sensors;
xi) computing a position and orientation of the printing module in the 3D representation of the surface;
xii) deriving a probabilistic quantification of said computed position and orientation of the printing module from one or more measuring characteristics of the one or more range sensors;
xiii) deriving a probabilistic quantification of said measured position and orientation measurements of the printing module and the surface from one or more measuring characteristics of the global motion tracking devices, and calculating the position and orientation of the printing module relative to the surface from the position and orientation measurements of the printing module and the surface from the global motion tracking devices; and
xiv) merging the probabilistic quantification of the position and orientation of the printing module relative to the surface from the one or more range sensors and the probabilistic quantification of the position of the printing module relative to the surface from the global motion tracking devices.

In an embodiment, the step of creating a second measurement product by fusing data from said local sensing suite and said one or more global motion tracking devices to control the timing of applying printing material from said printing module comprises the steps of:
v) receiving one or more travel distance measurements from the one or more relative motion sensors in the local sensing suite;
vi) fusing said travel distance measurements with the pose measurements of the printing module from the one or more of global motion tracking devices;
vii) generating a triggering pulse when said fused travel distance measurement is equal to or greater than a predetermined travel distance; and
viii) sending the triggering pulse to the printing module wherein the triggering signal controls the printing heads to apply the printing material.

In an embodiment, the step of controlling a motion platform to move a printing module across a surface comprises the steps of:
- iv) commanding the motion platform to move the printing module along a pre-planned path relative to the surface;
- v) computing an error between said first measurement product and a desired position, orientation, and velocity of said printing module relative to said surface; and
- vi) applying a plurality of motion correcting commands to the motion platform to correct said errors in the position, orientation, and velocity of the printing module relative to said surface.

In an embodiment, the pre-planned path relative to the surface is determined by the steps of:
- iii) dividing said livery image into a plurality of swaths; and
- iv) generating a plurality of paths corresponding to the plurality of swaths for the printing module to follow.

In an embodiment, dividing a livery image into a plurality of swaths comprises:
- iv) loading a 3D representation of the surface from a computer file containing computer readable information of the surface;
- v) overlaying a representation of the livery image to be printed onto the 3D representation of the surface; and
- vi) dividing the 3D representation of the livery image into a plurality of swaths.

In an embodiment, dividing a livery image into a plurality of swaths further comprises
- v) acquiring data from a local sensing suite and one or more global motion tracking devices;
- vi) generating a 3D representation of the surface from said acquired data;
- vii) overlaying a representation of the livery image to be printed onto the 3D representation of the surface; and
- viii) dividing the 3D representation of the livery image into a plurality of swaths.

In an embodiment, printing a livery image further comprises:
- v) controlling the mobile platform to move the printing module to follow a first path corresponding to a first swath of the plurality of swaths wherein a print material from the printing module is applied to form a first printed swath corresponding to the plurality of swaths;
- vi) determining a location for a next swath to be printed and aligning the next swath to be printed with the first printed swath;
- vii) controlling the printing module to follow a path corresponding to the next swath to be printed wherein the print material from the printing module is applied to form a next printed swath; and
- viii) repeating steps ii) to iii) until the plurality of swaths have been printed to form a plurality of printed swaths.

In an embodiment, applying the printing material from the printing module to form the next printed swath comprises applying the printing material to a plurality of regions in close proximity to the one or more boundaries of the first swath at a reduced intensity whereby the path of the next swath to be printed is shifted to allow for overlap between the first printed swath and the next printed swath.

In an embodiment, determining the location for the next swath to be printed and aligning the next swath to be printed to a first printed swath comprises the steps of:
- iv) determining a plurality of boundaries of said first printed swath;
- v) computing a path shift for printing the next swath to be printed from said boundaries of said first swath; and
- vi) determining a new path to be followed by the printing module corresponding to the next swath to be printed by adding the path shift to the path corresponding to the first printed swath.

In an embodiment, determining a plurality of boundaries of a first printed swath comprises:
- v) acquiring one or more images of said first swath from the one or more optical sensors in the local sensing suite;
- vi) detecting a plurality of boundary measurements of the first printed swath from the one or more images of said first swath;
- vii) deriving a probabilistic quantification of the boundary measurements from a plurality of measurement characteristics of the one or more optical sensors; and
- viii) computing the boundary of said first swaths by fusing the probabilistic quantification of the boundary measurements with the one or more global measurements from the one or more global motion tracking devices.

In an embodiment, the present disclosure provides a system for applying a livery image to the surface of an object, comprising:
- vi) a printing module mounted on a motion platform and configured to apply a plurality of adjacent swaths of a print material to form an image on a surface comprising:
  - c) one or more tanks for storing the print material,
  - d) a plurality of printing heads for applying the print material,
- vii) a local sensing suite configured to acquire one or more images of the surface and to measure the motion of the printing module relative to the surface;
- viii) one or more global motion tracking devices configured for measuring the pose of the printing module, the motion platform, and the surface of the object;
- ix) a real-time processor being connected to the printing module, the motion platform, the local sensing suite, and the global motion tracking devices; and
- x) an executive computer interfaced with the real-time processor.

In an embodiment, the local sensing suite comprises any one or combination of:
- iii) one or more range sensors for measuring a distance to the surface; and
- iv) one or more relative motion sensors for measuring a relative motion of the printing module with respect to the surface.

In an embodiment, the local sensing suite comprises:
- ii) one or more optical sensors for acquiring one of more images of the surface.

In an embodiment, the printing module further comprises one or more material curing devices including UV lamps for curing the plurality of adjacent swaths of the print material.

In an embodiment, the motion platform comprises any one of a guiding frame, a multi-axis translation stage, a mobile vehicle, a multi-axis robotic manipulator, an actuating device, or a combination thereof.

In an embodiment, the motion platform comprises the translation stage, the multi-axis robotic manipulator carried by said translation stage, and the actuating device mounted on an end effector of said multi-axis robotic manipulator.

In an embodiment, the actuating device is decoupled from said translation stage and said multi-axis robotic manipulator carried by said translation stage, and said actuating device is controlled by a separate motion controller.

In an embodiment, the real-time processor is a computer programmed with instructions to fuse a plurality of measurements from the local sensing suite and the global motion tracking devices to estimate the motion of the printing module relative to the surface.

In an embodiment, the real-time processor is programmed with instructions to control the motion of the motion platform by receiving a pre-defined path and commanding the motion platform to follow the pre-defined path.

In an embodiment, the real-time processor is programmed with instructions for computing a plurality of motion correcting commands for the motion platform to maintain a desired position, orientation, and velocity of the printing module relative to the surface. In an embodiment, computing a plurality of motion correcting commands for the motion platform to maintain a desired position, orientation, and velocity of the printing module relative to the surface comprises the steps of:
  vii) acquiring data from one or more range sensors which measure a distance to said surface;
  viii) generating a 3D representation of said surface from the acquired data;
  ix) computing a position, orientation, and velocity of said printing module relative to said 3D representation of the surface;
  x) fusing the pose measurements of the printing module from one or more global motion tracking devices and said position, orientation, and velocity estimation from said range data and computing a filtered position, orientation, and velocity of said printing module relative to said surface;
  xi) computing an error between the filtered values and the desired values of the position, orientation, and velocity of said printing module relative to said surface; and
  xii) applying a plurality of motion correcting commands to the motion platform to correct said error in the position, orientation, and velocity of the printing module relative to said surface.

In an embodiment, the real-time processor is programmed with instructions for controlling the motion of the motion platform to align a plurality of adjacent swaths of a livery image. In an embodiment, controlling the motion of the motion platform to align a plurality of adjacent swaths of a livery image comprises the steps of:
  vi) commanding the motion platform to move the printing module to a region near a first printed swath;
  vii) acquiring one or more images of the first printed swath from one or more optical sensors in the local sensing suite;
  viii) detecting a plurality of boundaries of the first printed swath from the one or more images of said first printed swath;
  ix) computing a shifted path corresponding to a next swath be printed from said detected boundaries; and
  x) controlling the motion platform to move the printing module to follow the shifted path to print the next swath.

In an embodiment, the real-time processor is programmed with instructions for generating a plurality of triggering signals for controlling the timing of applying printing material from the printing module to form a plurality of swaths of a livery image. In an embodiment, generating the triggering signals for controlling the timing of applying printing material from the printing module to print a plurality of swaths of a livery image comprises the steps of:
  v) receiving one or more travel distance measurements from the one or more relative motion sensors in the local sensing suite;
  vi) fusing said travel distance measurements from the one or more relative motion sensors into a fused travel distance and optionally fusing said fused travel distance with pose measurements of the printing module from one or more global motion tracking devices;
  vii) generating a triggering pulse when said fused travel distance is equal to or greater than a predetermined travel distance; and
  viii) sending the triggering pulse to the printing module wherein the triggering signals prompts the printing heads to apply a printing material.

In an embodiment, the executive computer is programmed with instructions to provide system management capabilities and a plurality of user interfaces.

In an embodiment, the executive computer further comprises:
  v) a data logger configured to log acquired data;
  vi) a safety monitor configured to generate an emergency stop alarm;
  vii) a human machine interface; and
  viii) a print controller programmed to execute one or more printing programs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A system for applying a livery image to the surface of an object, comprising:
  a printing module mounted on a motion platform and configured to apply a plurality of adjacent swaths of a print material to form an image on a surface, the printing module including one or more tanks for storing the print material and a plurality of printing heads for applying the print material;
  a local sensing suite configured to acquire one or more images of the surface and to measure the motion of the printing module relative to the surface;
  one or more global motion tracking devices configured for measuring the pose of the printing module, the motion platform, and the surface of the object;
  a real-time processor being connected to the printing module, the motion platform, the local sensing suite, and the global motion tracking devices, said real-time processor is programmed with instructions for generating a plurality of triggering signals for controlling the timing of applying printing material from the printing module to form a plurality of swaths of a livery image by the steps of:
    receiving one or more travel distance measurements from the one or more relative motion sensors in the local sensing suite;
    fusing said travel distance measurements from the one or more relative motion sensors into a fused travel distance and fusing said fused travel distance with pose measurements of the printing module from one or more global motion tracking devices;
    generating a triggering pulse when said fused travel distance is equal to or greater than a predetermined travel distance; and
    sending the triggering pulse to the printing module wherein the triggering signals prompts the printing heads to apply a printing material; and an executive computer interfaced with the real-time processor.

2. The system according to claim 1, wherein the local sensing suite comprises any one or combination of:
one or more range sensors for measuring a distance to the surface; and
one or more relative motion sensors for measuring a relative motion of the printing module with respect to the surface.

3. The system according to claim 1, wherein the local sensing suite comprises:
one or more optical sensors for acquiring one of more images of the surface.

4. The system according to claim 1, wherein the printing module further comprises one or more material curing devices including UV lamps for curing the plurality of adjacent swaths of the print material.

5. The system according to claim 1, wherein the motion platform comprises any one of a guiding frame, a multi-axis translation stage, a mobile vehicle, a multi-axis robotic manipulator, an actuating device, or a combination thereof.

6. The system according to claim 5, wherein the motion platform comprises a translation stage, the multi-axis robotic manipulator carried by said translation stage, and the actuating device mounted on an end effector of said multi-axis robotic manipulator.

7. The system according to claim 6, wherein said actuating device is decoupled from said translation stage and said multi-axis robotic manipulator carried by said translation stage, and said actuating device is controlled by a separate motion controller.

8. The system according to claim 1, wherein the real-time processor is a computer programmed with instructions to fuse a plurality of measurements from the local sensing suite and the global motion tracking devices to estimate the motion of the printing module relative to the surface.

9. The system according to claim 1, wherein the real-time processor is programmed with instructions to control the motion of the motion platform by receiving a pre-defined path and commanding the motion platform to follow the pre-defined path.

10. The system according to claim 1, wherein the executive computer is programmed with instructions to provide system management capabilities and a plurality of user interfaces.

11. The system according to claim 1, wherein the executive computer further comprises:
a data logger configured to log acquired data;
a safety monitor configured to generate an emergency stop alarm;
a human machine interface; and
a print controller programmed to execute one or more printing programs.

12. A system for applying a livery image to the surface of an object, comprising:
a printing module mounted on a motion platform and configured to apply a plurality of adjacent swaths of a print material to form an image on a surface, the printing module including one or more tanks for storing the print material and a plurality of printing heads for applying the print material;
a local sensing suite configured to acquire one or more images of the surface and to measure the motion of the printing module relative to the surface;
one or more global motion tracking devices configured for measuring the pose of the printing module, the motion platform, and the surface of the object;
a real-time processor being connected to the printing module, the motion platform, the local sensing suite, and the global motion tracking devices, wherein the real-time processor is programmed with instructions for computing a plurality of motion correcting commands for the motion platform to maintain a desired position, orientation, and velocity of the printing module relative to the surface by the steps of:
acquiring data from one or more range sensors which measure a distance to said surface;
generating a 3D representation of said surface from the acquired data;
computing a position, orientation, and velocity of said printing module relative to said 3D representation of the surface;
fusing the pose measurements of the printing module from one or more global motion tracking devices and said position, orientation, and velocity estimation from said range data and computing a filtered position, orientation, and velocity of said printing module relative to said surface;
computing an error between the filtered values and the desired values of the position, orientation, and velocity of said printing module relative to said surface; and
applying a plurality of motion correcting commands to the motion platform to correct said error in the position, orientation, and velocity of the printing module relative to said surface; and
an executive computer interfaced with the real-time processor.

13. The system according to claim 12, wherein the local sensing suite comprises any one or combination of:
one or more range sensors for measuring a distance to the surface; and
one or more relative motion sensors for measuring a relative motion of the printing module with respect to the surface.

14. The system according to claim 12, wherein the local sensing suite comprises:
one or more optical sensors for acquiring one of more images of the surface.

15. The system according to claim 12, wherein the printing module further comprises one or more material curing devices including UV lamps for curing the plurality of adjacent swaths of the print material.

16. The system according to claim 12, wherein the motion platform comprises any one of a guiding frame, a multi-axis translation stage, a mobile vehicle, a multi-axis robotic manipulator, an actuating device, or a combination thereof.

17. The system according to claim 16, wherein the motion platform comprises a translation stage, the multi-axis robotic manipulator carried by said translation stage, and the actuating device mounted on an end effector of said multi-axis robotic manipulator.

18. The system according to claim 17, wherein said actuating device is decoupled from said translation stage and said multi-axis robotic manipulator carried by said translation stage, and said actuating device is controlled by a separate motion controller.

19. The system according to claim 12, wherein the real-time processor is a computer programmed with instructions to fuse a plurality of measurements from the local sensing suite and the global motion tracking devices to estimate the motion of the printing module relative to the surface.

20. The system according to claim 12, wherein the real-time processor is programmed with instructions to control the motion of the motion platform by receiving a pre-defined path and commanding the motion platform to follow the pre-defined path.

21. The system according to claim 12, wherein the executive computer is programmed with instructions to provide system management capabilities and a plurality of user interfaces.

22. The system according to claim 12, wherein the executive computer further comprises:
    a data logger configured to log acquired data;
    a safety monitor configured to generate an emergency stop alarm;
    a human machine interface; and
    a print controller programmed to execute one or more printing programs.

23. A system for applying a livery image to the surface of an object, comprising:
    a printing module mounted on a motion platform and configured to apply a plurality of adjacent swaths of a print material to form an image on a surface the printing module including one or more tanks for storing the print material and a plurality of printing heads for applying the print material;
    a local sensing suite configured to acquire one or more images of the surface and to measure the motion of the printing module relative to the surface;
    one or more global motion tracking devices configured for measuring the pose of the printing module, the motion platform, and the surface of the object;
    a real-time processor being connected to the printing module, the motion platform, the local sensing suite, and the global motion tracking devices, wherein the real-time processor is programmed with instructions for controlling the motion of the motion platform to align a plurality of adjacent swaths of a livery image by the steps of:
        commanding the motion platform to move the printing module to a region near a first printed swath;
        acquiring one or more images of the first printed swath from one or more optical sensors in the local sensing suite;
        detecting a plurality of boundaries of the first printed swath from the one or more images of said first printed swath;
        computing a shifted path corresponding to a next swath be printed from said detected boundaries;
        controlling the motion platform to move the printing module to follow the shifted path to print the next swath; and
    an executive computer interfaced with the real-time processor.

24. The system according to claim 23, wherein the local sensing suite comprises any one or combination of:
    one or more range sensors for measuring a distance to the surface; and
    one or more relative motion sensors for measuring a relative motion of the printing module with respect to the surface.

25. The system according to claim 23, wherein the local sensing suite comprises:
    one or more optical sensors for acquiring one of more images of the surface.

26. The system according to claim 23, wherein the printing module further comprises one or more material curing devices including UV lamps for curing the plurality of adjacent swaths of the print material.

27. The system according to claim 23, wherein the motion platform comprises any one of a guiding frame, a multi-axis translation stage, a mobile vehicle, a multi-axis robotic manipulator, an actuating device, or a combination thereof.

28. The system according to claim 27, wherein the motion platform comprises a translation stage, the multi-axis robotic manipulator carried by said translation stage, and the actuating device mounted on an end effector of said multi-axis robotic manipulator.

29. The system according to claim 28, wherein said actuating device is decoupled from said translation stage and said multi-axis robotic manipulator carried by said translation stage, and said actuating device is controlled by a separate motion controller.

30. The system according to claim 23, wherein the real-time processor is a computer programmed with instructions to fuse a plurality of measurements from the local sensing suite and the global motion tracking devices to estimate the motion of the printing module relative to the surface.

31. The system according to claim 23, wherein the real-time processor is programmed with instructions to control the motion of the motion platform by receiving a pre-defined path and commanding the motion platform to follow the pre-defined path.

32. The system according to claim 23, wherein the executive computer is programmed with instructions to provide system management capabilities and a plurality of user interfaces.

33. The system according to claim 23, wherein the executive computer further comprises:
    a data logger configured to log acquired data;
    a safety monitor configured to generate an emergency stop alarm;
    a human machine interface; and
    a print controller programmed to execute one or more printing programs.

* * * * *